United States Patent
Black et al.

(10) Patent No.: US 9,472,066 B2
(45) Date of Patent: Oct. 18, 2016

(54) METHODS AND APPARATUS FOR SELF SERVICE TRANSACTIONS FROM MULTIPLE VENDORS

(75) Inventors: Jonathan Simon Black, Dundee (GB); Luis Eduardo Bravo, Atlanta, GA (US); Michael Robertson McNamara, Dundee (GB)

(73) Assignee: NCR CORPORATION, Duluth, GA (US)

( * ) Notice: Subject to any disclaimer, the term of this patent is extended or adjusted under 35 U.S.C. 154(b) by 1473 days.

(21) Appl. No.: 12/498,414

(22) Filed: Jul. 7, 2009

(65) Prior Publication Data

US 2011/0010271 A1    Jan. 13, 2011

(51) Int. Cl.
  *G06Q 30/00* (2012.01)
  *G06Q 50/00* (2012.01)
  *G06F 3/041* (2006.01)
  *G07F 17/40* (2006.01)
  *G06Q 10/08* (2012.01)
  *G06Q 20/18* (2012.01)
  *G06Q 30/06* (2012.01)

(52) U.S. Cl.
  CPC ........... *G07F 17/40* (2013.01); *G06Q 10/0875* (2013.01); *G06Q 20/18* (2013.01); *G06Q 30/06* (2013.01); *G06Q 30/0643* (2013.01)

(58) Field of Classification Search
  None
  See application file for complete search history.

(56) References Cited

U.S. PATENT DOCUMENTS

| | | | |
|---|---|---|---|
| 2003/0182195 A1* | 9/2003 | Kumar | 705/26 |
| 2005/0259087 A1* | 11/2005 | Hoshino et al. | 345/173 |
| 2006/0122917 A1* | 6/2006 | Lokuge et al. | 705/27 |
| 2007/0050197 A1* | 3/2007 | Efron | G06Q 10/02 705/26.1 |
| 2008/0163119 A1* | 7/2008 | Kim | G06F 3/04886 715/840 |
| 2008/0222004 A1* | 9/2008 | Pollock | G06Q 30/0603 705/15 |
| 2009/0189867 A1* | 7/2009 | Krah | G06F 3/044 345/173 |
| 2009/0219252 A1* | 9/2009 | Jarventie | G06F 3/04886 345/173 |
| 2009/0281903 A1* | 11/2009 | Blatstein | 705/15 |
| 2010/0097343 A1* | 4/2010 | Fang | 345/174 |

* cited by examiner

*Primary Examiner* — Ariel Yu
(74) *Attorney, Agent, or Firm* — Schwegman, Lundberg & Woessner; Peter H. Priest (57) ABSTRACT

Systems and techniques for managing orders from one or more of a plurality of vendors. A self service terminal includes a display presenting order icons that may be moved to an open area for initiation of an order, and a plurality of vendor icons representing different vendors. Initiating an order opens a transaction record for the order, and moving a vendor icon to an order icon opens a selection menu allowing selections from the vendor represented by the icon. The transaction record is continuously updated as selections are made. Upon a user selection to complete the order, a payment interface is presented allowing for payment. Upon payment, an order identifier is created and displayed, together with instructions for collecting or receiving the order, and order information is transmitted to each vendor contributing to the order, in association with the order identifier.

11 Claims, 7 Drawing Sheets

METHODS AND APPARATUS FOR SELF SERVICE TRANSACTIONS FROM MULTIPLE VENDORS

FIELD OF THE INVENTION

The present invention relates generally to improved systems and techniques for self service transactions. More particularly, the invention relates to improved systems and techniques for interactive icon based mechanisms for constructing orders that may be supplied by contributions from multiple vendors.

BACKGROUND OF THE INVENTION

The use of self service terminals for customer transactions has continued to become more and more widespread because of the benefits these terminals offer for both merchants and customers. Proper implementation and use of self service operations allows a merchant to achieve labor cost savings, and the use of a self service option can increase customer satisfaction by decreasing customer waiting time. Food court transactions typically involve selections from relatively limited menus, rendering the selections particularly accessible to self service operations. In addition, food courts often become crowded during heavy shopping periods, rendering any increased efficiency such as might be provided by self service terminals and operations employing such terminals, particularly desirable during those periods.

Food courts are typically served by a number of vendors, collectively offering a wide variety of choices. Customers often eat at food courts in groups, and different members of the group frequently make their selections from different vendors, each member of the group conducting a transaction at a selected vendor. The members of the group then reassemble to eat. Prior art food court operations typically involve conducting the transaction with a vendor at that vendor's location, so that it is inconvenient for a single customer to make selections from multiple vendors, or for customers who wish to select from multiple vendors to collaborate while making their selections. For example, to order hot and sour soup, pizza, and ice cream, a customer might need to line up, order, pay, wait for preparation, and collect the order, at each of three separate vendors.

SUMMARY OF THE INVENTION

The present invention provides for mechanisms for conducting self service transactions at a terminal capable of communicating with a number of different vendors so as to assemble a complete order, with the order and transaction information from each vendor being communicated to that vendor. A self service terminal, which preferably includes a touch screen display, allows a user or users to select an icon for each desired vendor. The touch screen display may suitably be responsive to multiple simultaneous touches, allowing multiple users to work on different orders or different aspects of the same order without interfering with one another, and providing for operations involving multiple touches, such as expanding or shrinking a window by simultaneously dragging corners of the window.

Selecting an icon opens an interface for that vendor, allowing each user interested in items from that vendor to make selections. Preferably, multiple interfaces from different vendors may be open at the same time, allowing members of a group to work on transactions from different vendors simultaneously, and interfaces for different orders may also be open at the same time, allowing different individuals or groups to use the same terminal simultaneously.

When all selections for an order have been made, payment is tendered at the terminal or at another central location, and each vendor's payment for its portion of the transaction is credited to that vendor. Each order preferably includes an identifier that is transmitted to each vendor, so that the different portions of the order may be identified with the order for assembly and delivery. If desired, the food court may be provided with an assembly area so that each vendor may deliver its orders to the assembly area, or each vendor may post or announce the identifier when presenting its portion of the order for pickup.

A more complete understanding of the present invention, as well as further features and advantages of the invention, will be apparent from the following Detailed Description and the accompanying drawings.

DETAILED DESCRIPTION

Figure 1:
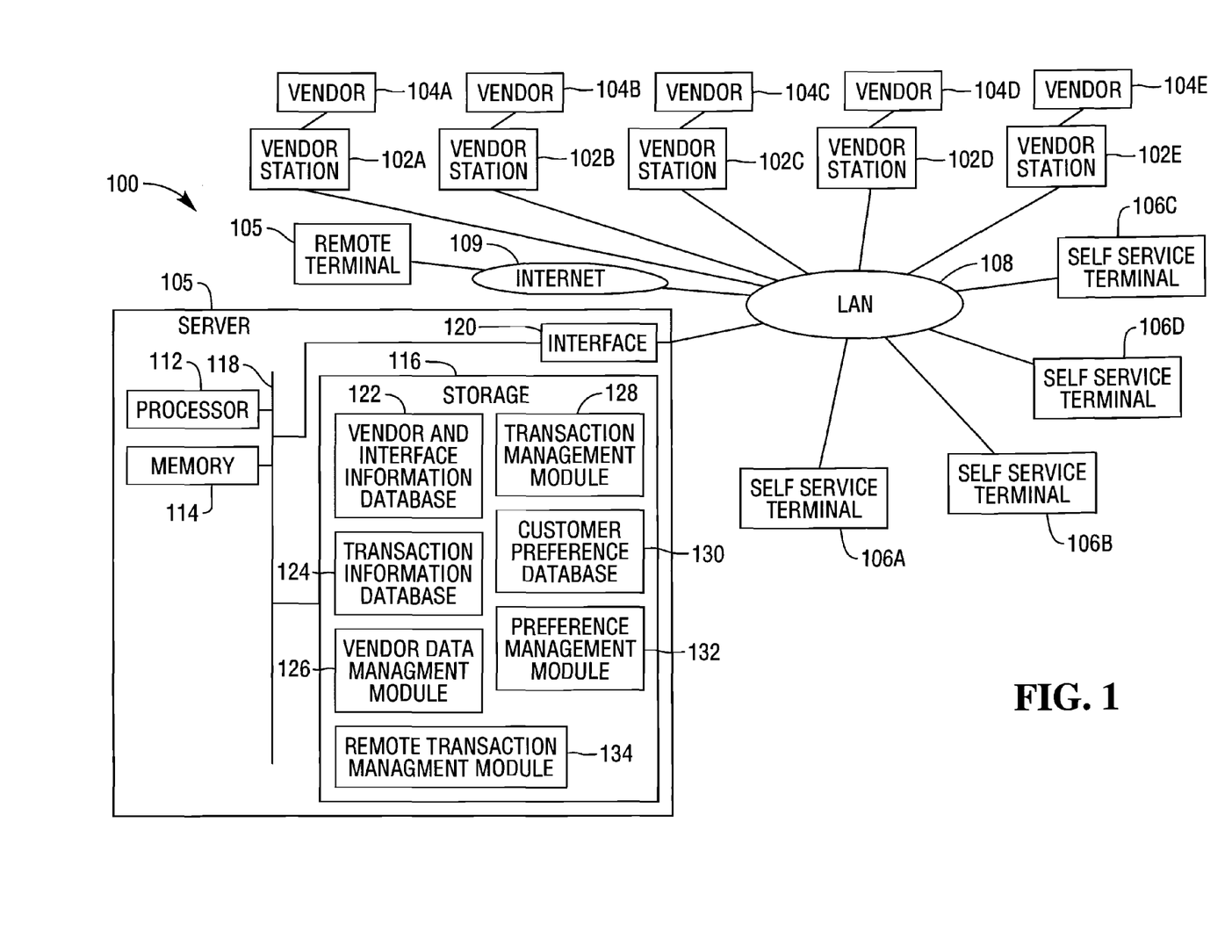
FIG. 1 illustrates a food court ordering system 100 according to an aspect of the present invention.

FIG. 1 illustrates a food court ordering system 100 according to an aspect of the present invention. The system 100 comprises a plurality of vendor stations 102A-102E, operated by vendors 104A-104E. The vendor stations 102A-102E communicate with a server 105, which manages communication with a plurality of centralized self service order terminals 106A-106D, and may also communicate with remote terminals such as the remote terminal 107, which may be implemented as a personal computer (PC). The server 105 communicates with the vendor stations 102A-102E, the terminals 106A-106D, and one or more terminals such as the terminal 107 over a network 108. The network 108 may be a wired or wireless network, or may include both wired and wireless connections, and may provide access to the public Internet 109 for remote communications such as communication with the terminal 107. The server 105 suitably includes a processor 112, memory 114, and storage 116, communicating over a bus 118. The server 105 may also include a network interface 120 for communication with the network 108.

The server 105 suitably stores instructions and data for managing and facilitating customer ordering using the terminals 106A-106D and remote terminals such as the terminal 107. For example, the server 105 may maintain a vendor menu and interface information database 122, storing information used in constructing self service interfaces for the 106A-106D, and may also maintain a vendor transaction information database 124, storing transaction details for the different vendors, indicating each vendor's credit for transactions and other information relating to transactions. Such other information may include delivery details, inventory drawdown, and other relevant information, and appropriate updates may be transmitted to vendors or to entities operating on their behalf at desired intervals. For example, delivery details and inventory drawdown information may be relayed to the vendor stations after each transaction, while financial information may be relayed to the vendor stations and to designated financial institutions.

The server 105 suitably updates the vendor menu and interface information database 122 with price and menu information for each vendor, receiving updates as appropriate from each of the vendor stations 102A-102E, and delivering the updates to each of the vendor stations 102A-102E either as they are received or according to a prescribed schedule. The server 105 suitably maintains appropriate instructions implemented in the form of software modules stored in storage 116 and transferred to memory 114 as needed for execution by the processor 112. Such modules may include a vendor data management module 126 for managing data use to create user interfaces employed by the terminals 106A-106D, and a transaction management module 128 for managing transfers of data between the terminals 106A-106D and the server 105, and between the server 105 and the vendor stations 102A-102E. The server 105 may also suitably employ a customer preference database 130, storing customer preference information. Such customer preference information may be developed and maintained, for example, using a preference management module 132. The preference management module 132 may be employed in conjunction with a loyalty program or other suitable mechanism for tracking customer selections. Such mechanisms allow for identification of customers at the time orders are entered and compiles order information associated with each identified customer. In addition to other functions directed toward managing in conjunction with a loyalty program or similar customer identification program which may be used to simplify ordering for customers who identify themselves at the time of placing an order. As customer orders are placed and transferred to the server 105, the customer selections are stored and processed to identify preferences indicated by the selections, and such identified preferences are compiled and stored in the customer preference database 130.

In order to provide for communication with remote terminals such as the terminal 107, the server 105 may also present a remote transaction management module 134. The remote transaction management module 134 manages communication over the public Internet 109 or similar remote communication mechanisms, and constructs user interfaces compatible with remote terminals being used. The remote transaction management module 134 also mediates between the remote terminal 107 and similar terminals and the vendor transaction database 124, receiving selection and payment information and storing and transferring the information as appropriate.

It will be recognized that numerous configurations and designs of a system such as the system 100 may be employed. For example, as an alternative to use of a server such as the server 105, numerous alternative mechanisms for communication between the vendor stations 102A-102E may be employed, such as communicating information directly between each station and each self service terminal.

Figure 2:
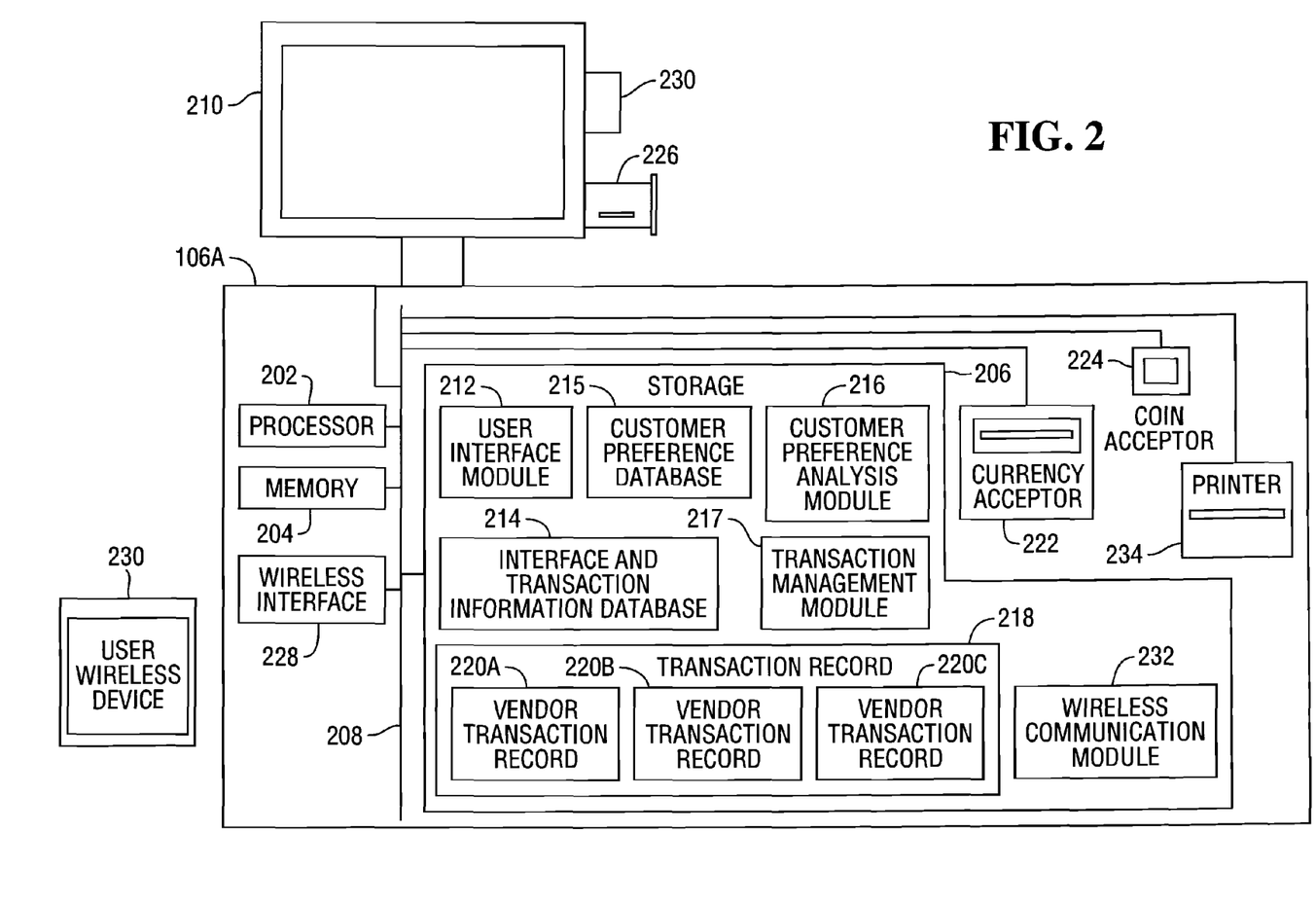
FIG. 2 illustrates details of a customer self-service terminal according to an aspect of the present invention.

Each of the self service terminals 106A-106D maintains a user interface providing a convenient mechanism for assembling orders including components from multiple vendors. FIG. 2 illustrates additional details of the self service terminal 106A. To avoid duplication, the terminals 106B-106D are not described in detail, but it will be recognized that they may be similar in design and operation to the terminal 106A. The terminal 106A includes a processor 202, memory 204, and long term storage 206, communicating over a bus 208. The terminal 106A also includes a touch screen display device 210, also communicating using the bus 208. The touch screen display device 210 is preferably capable of sensing and responding to multiple simultaneous touches, allowing simultaneous operations by multiple users, as well as operations involving multiple coordinated actions, such as expanding or contracting a window or object by simultaneously dragging opposite corners.

The terminal employs a user interface module 212, preferably implemented as software stored on the long term storage 206 and transferred to memory 204 as needed for execution by the processor 202. The user interface module 212 creates and manages a display for presentation on the display device 210, comprising a set of icons that may be manipulated by one or more users to construct an order. In one embodiment, the display designates a set of vendor icons representing the different vendors that are available. The vendor icons may be dragged to an active area, which may be represented by its own icon, such as a tray icon. A tray icon may be moved to or created in a desired area on the display in order to open an order. Multiple independent orders may be opened at the same terminal. Such opening of multiple orders may be accomplished for example, through the movement of multiple tray icons to different areas on the display.

Numerous mechanisms for opening an order may be contemplated. For example, a tray stack may be present in a designated area of the display, and a tray may be moved from the stack in order to open an order. Alternatively or in addition, moving of a vendor icon to an open space on the display may be recognized as indicating an intent to open an order and may cause a tray icon to appear, with an ordering interface for the vendor appearing on or near the tray icon. If a vendor icon is moved to one tray icon, a new vendor icon may appear in its place, allowing any vendor icon to be used with multiple orders.

The vendor icons are suitably distinctive in appearance, and each vendor's icon may be designed according to the vendor's specifications. A vendor icon will typically include trademarks used to identify the vendor.

When a tray icon is dragged from the stack and a vendor icon is dragged to the tray icon, the user interface module 212 opens a transaction menu for that vendor, allowing one or more customers in a party to make selections. The transaction menu is constructed using information from an interface and transaction information database 214, which includes interface configuration and appearance information, as well as a comprehensive collection of menu information for each vendor. The menu information includes item names and descriptions, price information for each item, combination pricing for named combinations and rules and instructions for menu presentation. For example, in order to conserve space on the display device 210 and to simplify use, the menu may be presented in stages, with an initial menu page presenting a limited number of selections, such as the most popular selections, as well as categories that may be expanded to present a more comprehensive list of items for the category. The food court operator, and each vendor, may also wish the interface to exhibit various visual characteristics, and specifications for the visual characteristics for the various elements of the interface may be stored in the interface and transaction information database 214.

To further simplify usage, the transaction menu may maintain a customer preference database 215, which may be received periodically from the server 105, based on selection and processing of information stored in the database 130. In addition, transaction information for identified customers may be transferred to the server 105 for use in updating the database 130.

An entity maintaining a system such as the system 100 may offer a loyalty program or similar program tracking customer purchases. In conjunction with such a program, customers may be provided with identification indicia such as identification cards. At the beginning of an order, each customer may be given the opportunity to present his or her identification indicia. The user interface module 212 passes such identification indicia to a customer preference analysis module 216, which retrieves customer preference information from the database 215. Customer preference information is retrieved for each customer for which identification indicia is provided. It is not necessary to identify the customer using personally identifiable information, only to identify the customer sufficiently that selections made by the same customer are understood as coming from the same customer.

The user interface module 212 also invokes a transaction management module 217, which receives customer inputs from the user interface module 212 and uses the customer inputs and stored information for each vendor to open a transaction record 218 and to update the transaction record in accordance with customer inputs. In the present example, the transaction record 218 includes vendor transaction records 220A, 220B, and 220C, for transactions involving vendors 102A, 102B, and 102C.

When a vendor icon is dragged to the active area, the user interface module 212 opens a menu for that vendor, as well as an overall transaction display presenting the transaction record 218, with the display being updated as the transaction record 218 is updated. As each selection is made, the user interface module 212 delivers the results of the selection to the transaction module 214, and the transaction management module 217 performs needed computations and delivers running totals to the user interface module 212 for the transaction display. The transaction module 217 simultaneously maintains and updates the transaction record 218 with transaction entries made in response to the selections, with updates being made to the vendor transaction record for each vendor involved, as well as the overall transaction record 218.

In order to simplify the ordering process and to increase convenience for customers, the user interface module 212 invokes the user preference module 216 when an order is opened. When a vendor icon is moved to the active area for the order, the user preference module examines the user preference database 215 to determine whether customers who have been identified in association with the order. If preferences among the vendor's selections have been identified for the identified users, the user preference module 215 transfers appropriate information to the user interface module 212, and the user interface module 212 employs such information to highlight preferred items in an initial selection and to otherwise emphasize selections that are more likely to meet the needs of the customers.

Vendor icons may be dragged to the active area as desired, with users navigating through the different menus to make desired selections. Different vendor menus may be open simultaneously for one order, and selections for that order may be made simultaneously from the different menus, with the transaction display and the transaction record 218 being updated as the selections are made.

As an order is constructed, customers working on that order may move vendor icons to the active area for that order as desired, and the customers may navigate through the menus associated with the various icons until satisfied with the order. An entry is then made specifying that the order is to be completed. After this entry is made, a transaction completion menu is opened, presenting an order summary a final transaction total is presented, along with options for payment. One a payment option is selected, the customer is able to tender payment, for example, through the use of a currency acceptor 222, a coin acceptor 224, and a financial card reader 226, which may provide facilities for reading any standardized financial card, such as a magnetic card or a smart card. In addition, the terminal 106A may also include a wireless interface 228, allowing payment using a customer's wireless communication device 230. The wireless communication device may include stored identifying information so as to automatically present such information to the terminal 106A. The terminal 106A, upon satisfactory authentication of the stored identifying information, such as through the entry of a personal identification number (PIN), relays the information provided by the customer device to a financial institution for processing of payment.

Alternatively, the terminal 106A may employ a wireless payment interface module 232. The wireless payment interface module 232 invokes the wireless interface 228 to communicate with the customer's device 230. The wireless payment interface module 232 presents a financial transaction interface to the device 230. The interface may, for example, present a transaction total and various options for tendering payment, such as stored credit or debit card information. The wireless payment interface module 232 transfers payment details to the transaction module 217 for processing of payment and completion of the transaction.

The terminal 106A also includes a printer 234 for printing a transaction receipt, which preferably includes details of the order, payment details, and details helpful in collecting the order, such as an order number and a list of vendors contributing to the order.

Once payment has been completed, an order identifier is created and stored in the transaction record 218. A copy of the transaction terminal 218 is displayed using the display device 210 and printed using the printer 234. The printed record may encode the order identifier as a bar code or similar machine readable code.

The transaction module 214 transfers the transaction record 218 to the server 105, which credits the financial record for each vendor with the payment attributable to that vendor's portion of the order. The server 105 further submits each portion of the order to the vendor responsible for its fulfillment, by sending appropriate information from the transaction record 218 to the various vendor stations 102A-102E. Each of the vendor stations delivers order details to personnel responsible for its fulfillment, including the identifier associated with the order. When the vendor's portion of the order is completed, appropriate measures are taken for its delivery to the customer, such as delivery to a central assembly area or posting or announcement of a notification that the vendor's portion of the order is ready. Mechanisms of delivery to the customer may vary depending on the particular circumstances of an order) or the desires of the customer. For example, when an order is fulfilled by only one vendor, it may be desired to bypass the step of delivering the order to an assembly area and simply announce the availability of the order. To take another example, the customer interface for an order may offer a choice as to how the order is to be delivered, so that one party may choose to receive the entire order at a central delivery area, while another party may choose to dispatch representatives to the various vendors delivering the order components. As another example, each vendor contributing to the order may assemble the order in its ordinary course of operations. One or more copies of the transaction record are printed using the printer 234, and the copy or copies are presented at each of the vendors contributing to the order. The vendor identifies the order based on the order identifier presented on the receipt, for example, by scanning a bar code on the receipt. The vendor's portion of the order is retrieved and delivered to the customer presenting the receipt. If multiple copies of the receipt have been printed, different members of the party may present these copies at other vendors. If only one copy has been printed, such as in the case where a single customer orders from multiple vendors, the receipt may be printed at the different vendors to collect the various portions of the order.

The interface and transaction information database 214 is preferably updated as needed. Such updating may be performed on a schedule, such as every evening, with updating occurring only at those times when new information is available. Suitably, each of the vendor stations 102A-102E transmits new or updated information to the server 105 as such information is created or goes into effect. Examples of such information include new menu items, menu price changes, promotional and advertising information, and other information. The server 105 may suitably incorporate new information into a master version of the interface and transaction database 214 and transmit it to each of the terminals 106A-106E. It will also be recognized that numerous alternative approaches exist. For example, updated information may be transmitted by the server 105 to the self-service terminals for incorporation into the server's vendor menu and interface information database 122. Such an approach may be desired if one or more of the terminals 106A-106E operates differently from the others, as in the case in which a terminal is adapted for speakers of a different language. Another approach is for each of the vendor stations 1024A-102E to transmit its new or updated information to the terminals 106A-106E, as might be desired in the case in which a central server 105 is not used. Still another approach might be for a remote server or other information repository to transmit updated information. By maintaining vendor information locally, and by updating such information when needed, terminals such as the terminal 106A avoid the need to communicate with the vendor stations 102A-102E during order development at every transaction. By providing updates only when new information is available, the frequency of communication with the terminals for the purpose of updating information is reduced.

Figure 3A:
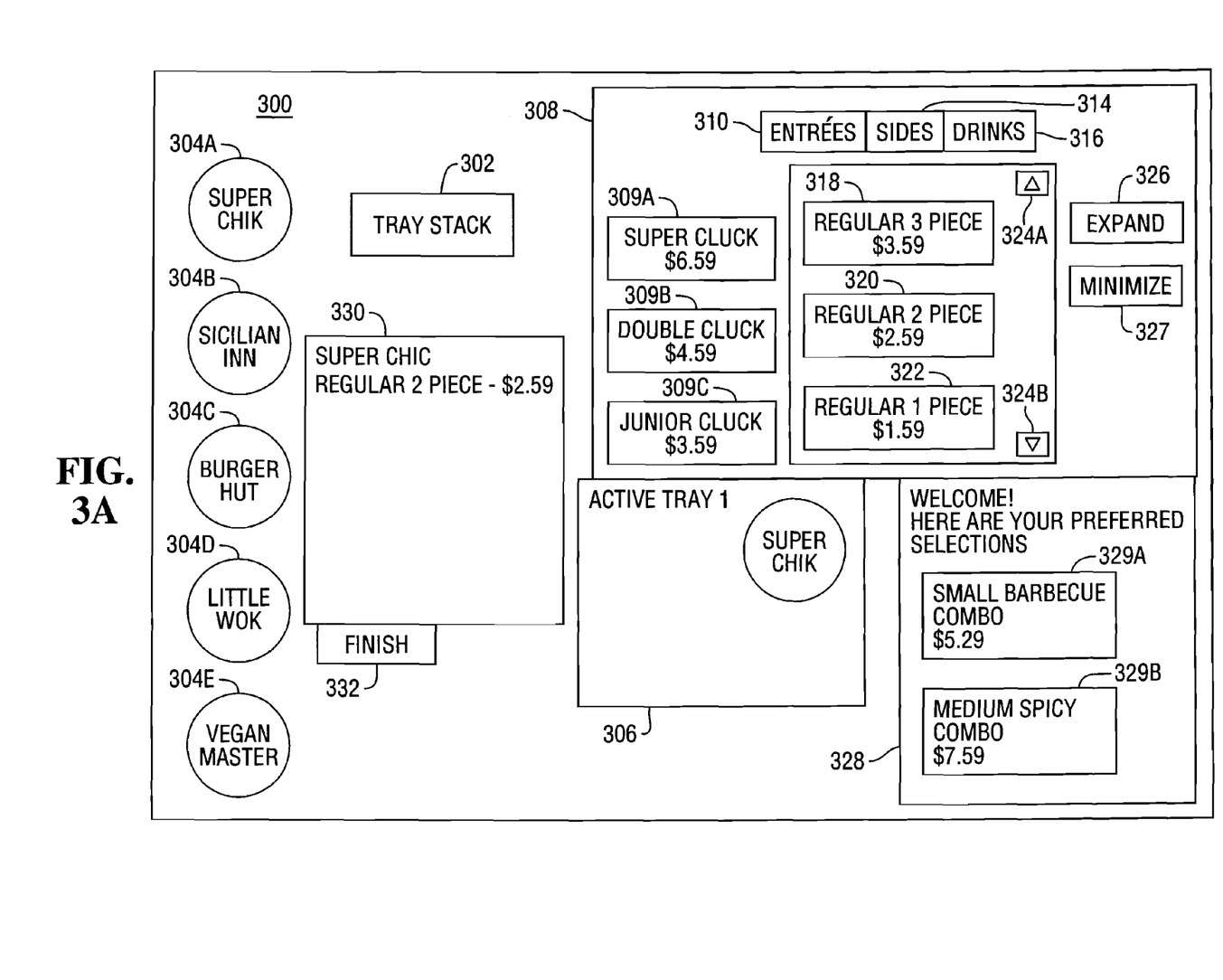
FIGS. 3A-3D illustrate exemplary displays presented by a customer self-service terminal as an order progresses.

FIG. 3A illustrates details of a display 300 presented by a display screen such as the display screen 210 of the terminal 106A. The display 300 depicts a tray stack 302 and a selection of vendor icons 304A-304E. The display 300 also depicts a tray icon 306 that has been moved off the tray stack 302 and onto a free space on the display 300. An instance of the icon 304A, representing the vendor 102A, has been moved onto the tray icon 306, resulting in the opening of an initial menu page 308 for the vendor 102A. The menu page 308 presents some of the more popular options, in this case, selector buttons 309A-309C for choosing one or more combination meals, along with tools for entering additional choices. These include category headers 310-316, for entrées, sides, and drinks. Upon selection of a category header by a user, an expanded view of the category appears, with a selection of category items that may be chosen along with scroll arrows for scrolling up and down in the category. In the presently illustrated view, the category header 312, for entrees, has been selected, showing an expanded view presenting selectors 318-322, for junior, regular, and deluxe dinners, respectively, as well as scroll arrows 324A and 324B to allow scrolling through the remainder of the category.

In addition to the category headers 310-316, the menu page 308 presents additional navigation options, such as an expansion selector button 326, directing the presentation of an expanded menu. Activation of the selector 326, such as by touching, presents an expanded menu view allowing selection of items presented. An additional selector 327 is also present, allowing users to collapse the menu page 308 while still leaving active the selections that have been made so far, and preserving the option to open the menu page 308, with the active selections still presented, by touching the vendor icon. This feature allows for display space to be made available for other uses, such as for the presentation of menus from different vendors.

The display 300 also presents a preferred selections page 328, which opens after identification has been presented for one or more customers involved in the order. Such presentation may be accomplished, for example, by presenting a loyalty program identification card at the reader 226. The preferred selections page 328 is constructed using preferred selections for the identified customer or customers, and for the vendors that have so far been associated with the order. In the present example, preferred selections are indicated by the buttons 329A and 329B. Different preferred selections will be presented depending on the identified customers and the selected vendors.

In the present example, the selector 320, indicating a regular 2 piece entrée, has been activated by touching. The selection has been processed by the interface module 212, which has interpreted the selection using the database 214. The identity and price of the item indicated by the selection has been retrieved from the database 214 and transferred to the transaction module 216, which has opened a transaction record for the transaction. The interface module 212 has also opened a transaction interface 330, which presents the transaction details entered so far. The transaction details are organized by vendor, with the identity and price of items from a vendor presented in association with that vendor. A transaction total is also presented, together with a finish transaction selector button 332 for initiation of payment.

The display 300 and the various icons and pages may be used in ways that take advantage of a multi touch capability. For example, multiple orders may be opened by creating additional active areas, for example by dragging additional tray icons from the tray stack. Users may work on multiple orders simultaneously without interfering with one another. Similarly, users working on different selection menus for the same order may perform simultaneous operations. Users may also perform operations involving multiple touches, such as dragging corners or borders to resize the tray icon 306 or similar tray icons for different orders, the menu page 308, the preferred selections page 328, the transaction interface 330, or other elements for which such operations may be desired.

Figure 3B:
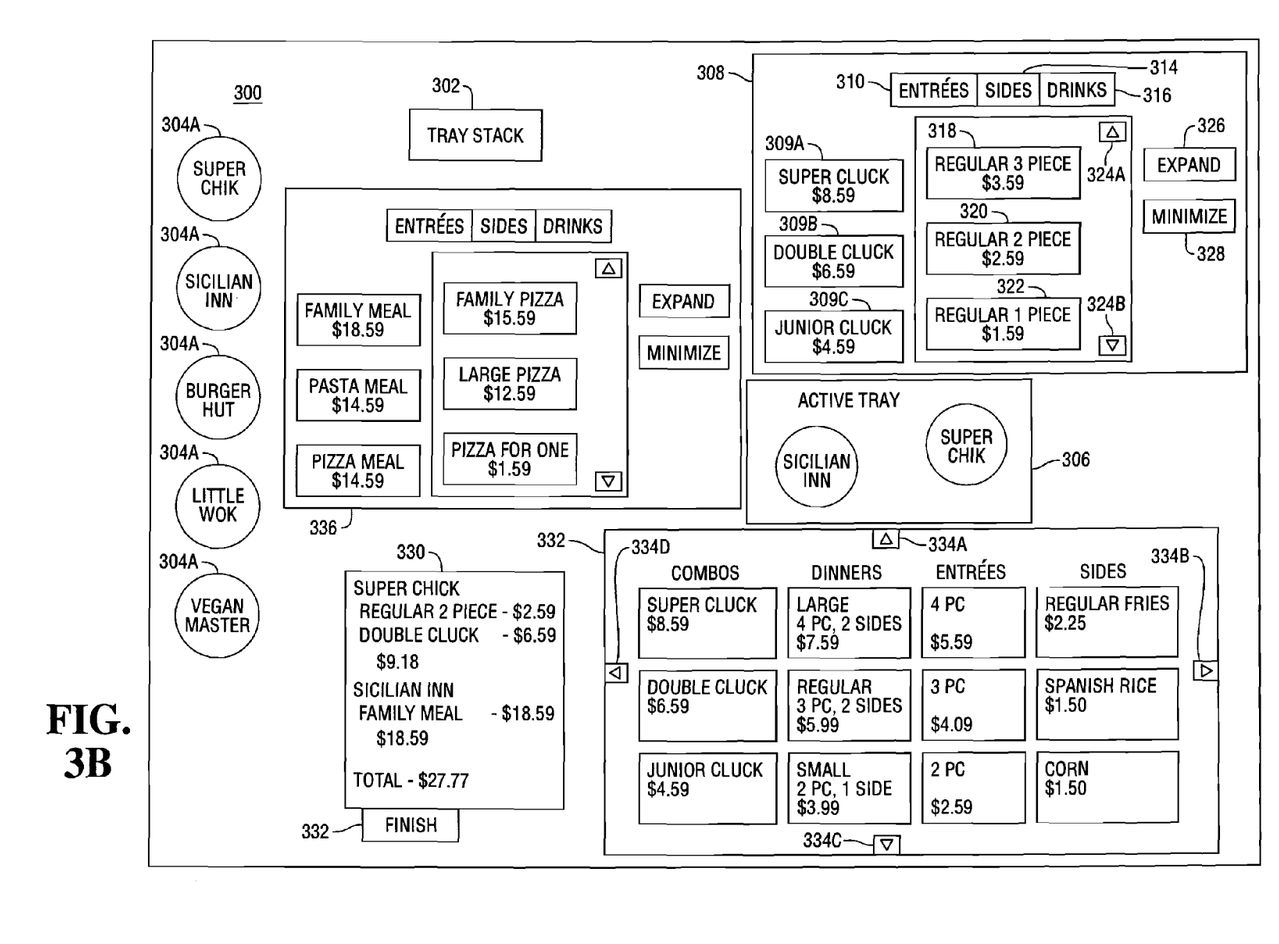

FIG. 3B illustrates the display 300 after additional user activities. The selector 326 has been activated, presenting an expanded menu display 332. The expanded display presents a relatively large display space allowing a simultaneous view of a number of menu items, and also includes scroll buttons 334A, 334B, 334C, and 334D, allowing vertical and horizontal scrolling in one page increments. Numerous additional alternatives for navigation exist, such as allowing the user to drag the menu within the display space, with the display space serving as a window to the menu. Alternatively, the expanded menu display 332 may be designed so as to simultaneously present all available choices from a vendor. In addition, the vendor icon 304C has been moved to the tray icon 306, opening a menu display page 336 for the vendor 104C. Additional selections have been made from the expanded menu display 332 and the menu display page 336, resulting in the entry of additional information in the transaction interface 330.

Figure 3C:
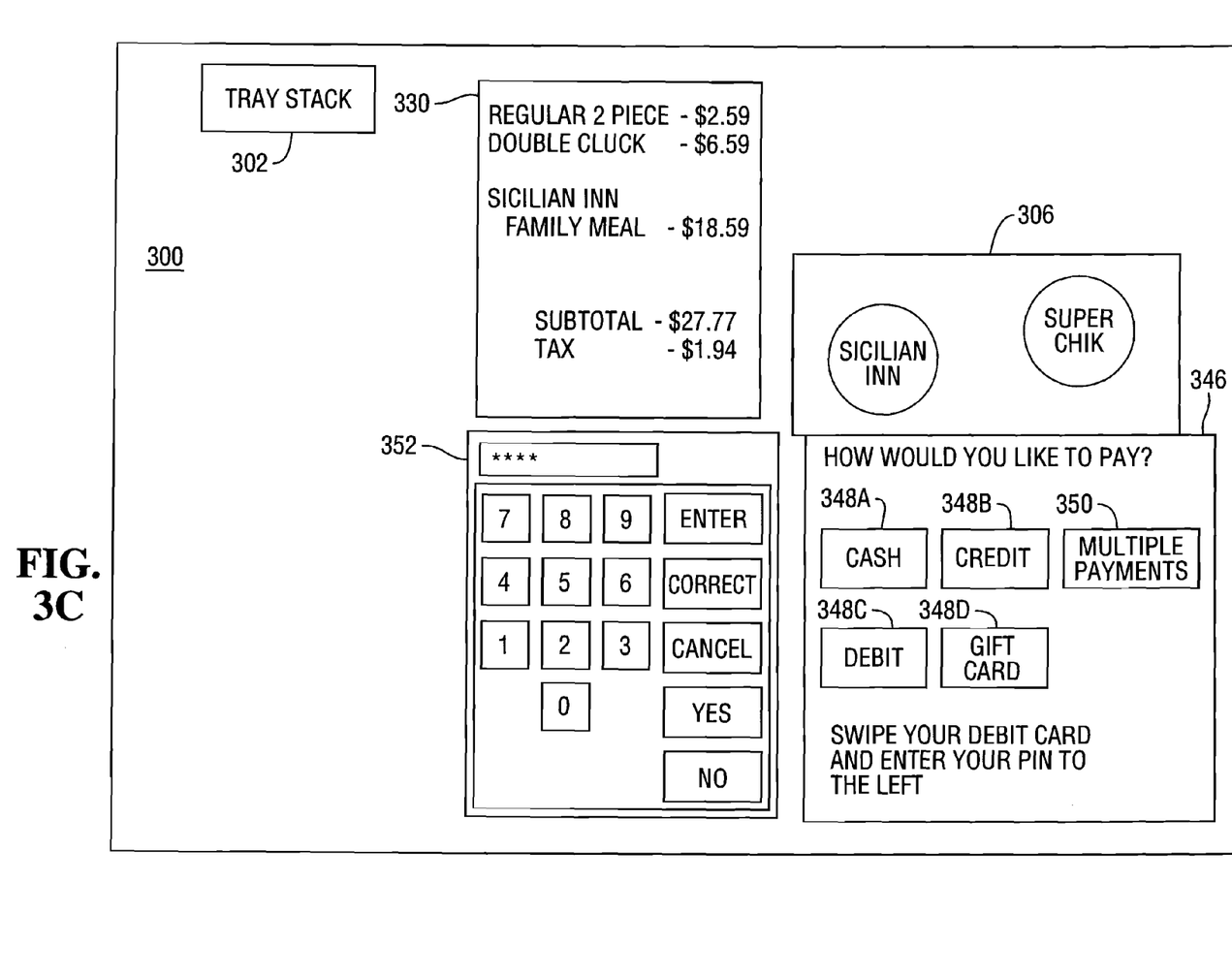

FIG. 3C illustrates the display 300 after the finish transaction selector button 332 has been activated. Activation of the finish transaction selector button 300 directs the transaction module 218 to process transaction completion and payment. The transaction module 216 computes transaction totals for each vendor and an overall transaction total, and updates the transaction record 218 accordingly. The transaction module 216 then presents the transaction interface 330, updated to show final totals for each vendor, an overall subtotal, tax, and a final transaction module also opens a payment interface 346. The payment interface 346 allows the user to select from various payment options, for example by activating one of the selectors 348A-348D, for cash, credit, debit, or gift card, respectively. A selector 350 is also shown, allowing users to select multiple payments, as in the case in which a group of friends eats together, with each person wishing to pay separately. In such a case, payments may be made with the amount of each payment being specified until the order total is paid. If each user can be identified, for example, by associating each user's selections with a loyalty card identifier, the total for each user's selections may be presented for payment.

Here, the user has chosen to pay by debit card, so that the payment interface 346 presents instructions to insert the user's card in the reader 226 and also presents a PIN panel display 352 for entering the user's personal identification number (PIN).

Figure 3D:
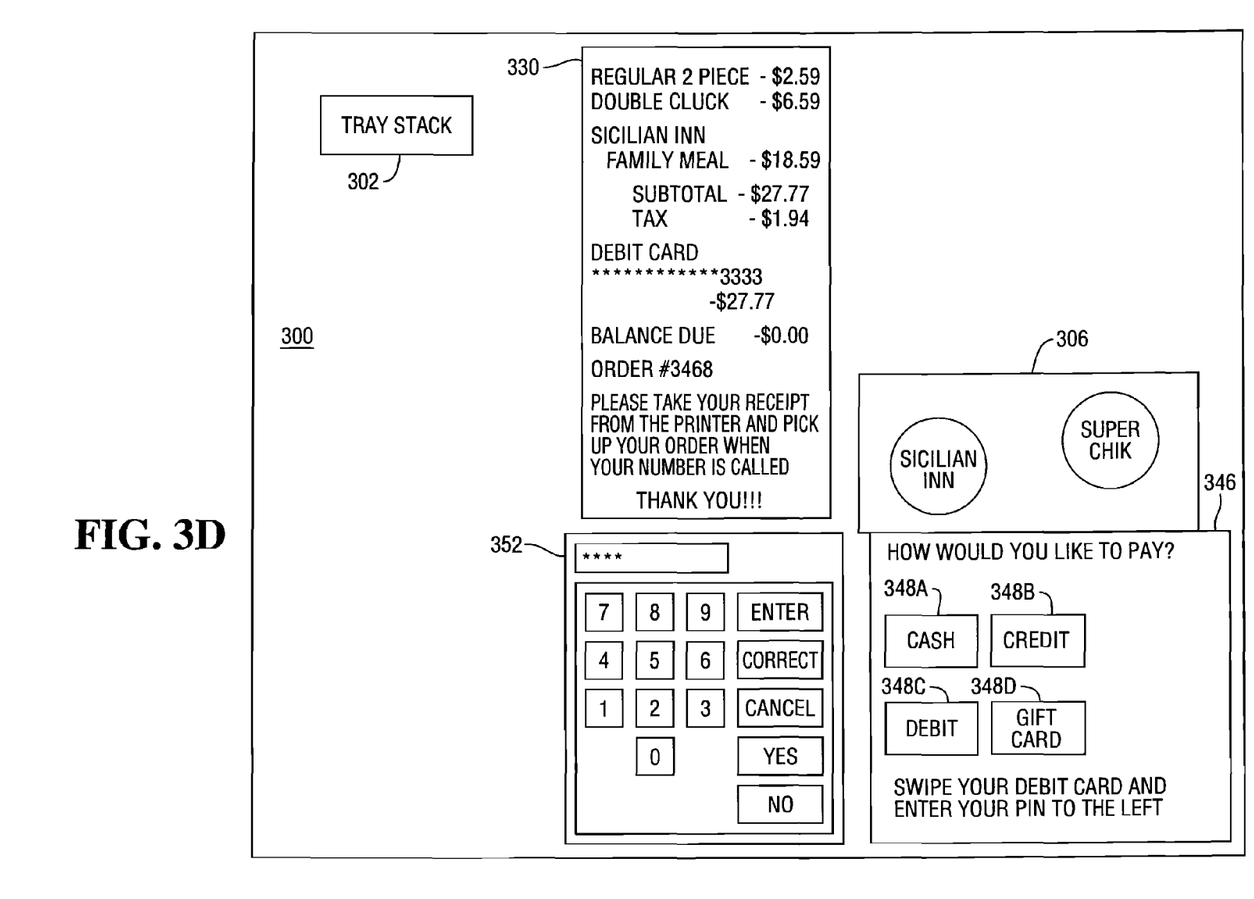

FIG. 3D presents the display 300 after payment details have been completed. The transaction interface 346 presents details of the transaction and completed payment, together with an order number and a list of vendors supplying elements of the order. The transaction details also include instructions on picking up or receiving delivery of the order, and indicate whether the order is to be picked up at one location or whether elements of the order are to be picked up from different vendors. These details may also be included in a receipt from the printer 234.

Figure 4:
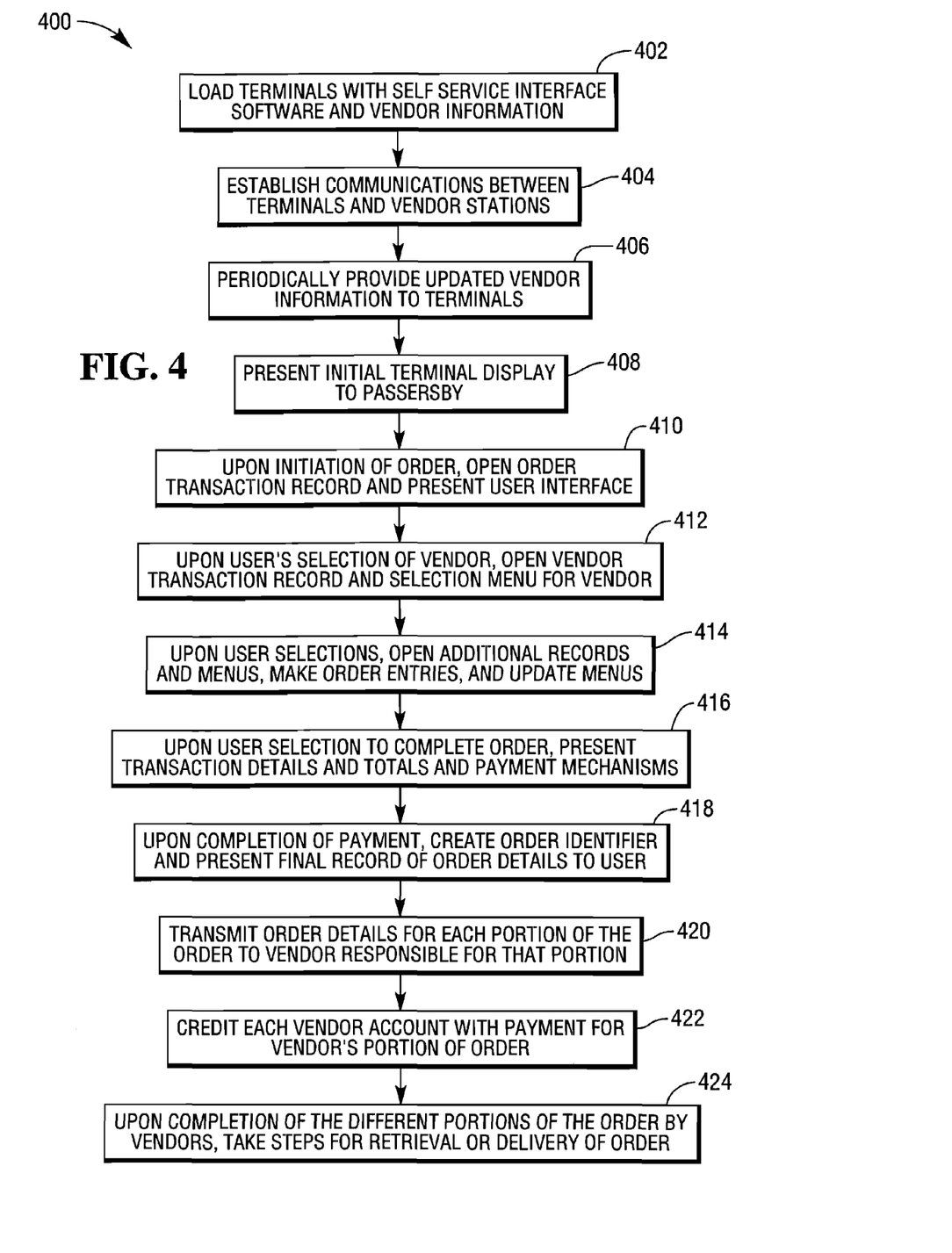
FIG. 4 illustrates a process of entering and managing orders from multiple vendors according to an aspect of the present invention.

FIG. 4 illustrates the steps of a process 400 of order management and fulfillment according to an aspect of the present invention. At step 402, one or more self service terminals are loaded with icon based touch screen user interface software and vendor information for a plurality of vendors with which the terminals will be used. At step 404, communication connections are established between one or more transaction terminals and a plurality of vendor stations. The communication connections may be direct, or may be mediated through data processing devices, such as a server supporting all the vendor stations. At step 406, updated vendor information is periodically provided to the transaction terminals.

At step 408, the terminals present an initial display to passersby. The initial display presents an icon representing a tray stack, a collection of vendor icons representing vendors from whom items may be purchased, and instructions for beginning an order. At step 410, upon a user's initiation of an order, an order transaction record is opened and a display is created for the order transaction, in order to present selection and order information as entries and selections are made to the order. Initiation of an order may involve dragging a tray from the tray stack into an open space, or moving a vendor icon on an open space, causing automatic placement of a tray icon onto the space with the vendor icon appearing on top of the tray icon. The order transaction record provides a locus for selections and commands performed using vendor icons and interface appearing in response to selections and operations made using the vendor icons placed on one tray icon. Different transactions may be initiated if other tray icons are moved to open spaces, with a transaction record opened for each.

At step 412, upon a user's selection of a vendor, such as by moving of a vendor icon onto a tray icon, a selection menu is opened for the vendor and a vendor transaction record is opened for the vendor represented by the vendor icon, within the order transaction record. Step 412 is repeated whenever a different vendor icon is moved to the tray icon, allowing opening of selection menus and transaction records for a single order involving multiple vendors.

At step 414, upon selections by a user or users, additional menus and displays are opened, entries are made into order transaction record and each vendor transaction record, and the order transaction display is updated. At step 416, upon a user selection to complete the order, order details and totals are presented and the user is presented with mechanisms and instructions for payment. At step 418, upon completion of payment, an order identifier is created and a final record of order details is presented to the user, for example, by presenting a display and by furnishing the user with a printed copy. The final record suitably includes the order identifier and instructions for receiving the order. At step 420, order details for each portion of the order are transmitted to the vendor responsible for that portion of the order, with the transmitted information including the order identifier. At step 422, an account for each vendor is credited with the vendor's share of payment for the order. At step 424, upon completion of the different portions of the order by the vendors, steps are taken for their retrieval or delivery to the customer or customers placing the order. Such steps may include assembling the order at a central location for pickup, or displaying or otherwise issuing a notice at each vendor that the vendor's portion of the order is available for pickup.

While the present invention is disclosed in the context of a presently preferred embodiment, it will be recognized that a wide variety of implementations may be employed by persons of ordinary skill in the art consistent with the above discussion and the claims which follow below.

We claim:

1. A terminal for placing order with plural vendors, comprising:

a user interface for displaying information to and receiving inputs from a user; storage for maintaining a transaction record based on vendor information and user inputs and reflecting selections from one or more of the plurality of vendors;

a transaction information database storing vendor information including a selection view for each of the plural vendors; and a processor for retrieving stored vendor information, creating a user display based on stored vendor information, the user display including a vendor icon for each of the plural vendors and managing a transaction associated with one or more orders, the processor opening a transaction record for an order upon initiation of an order by a user and to display a selection menu for each vendor upon a user's selection of that vendor, the processor being operative to update the transaction record based on user selections and to present successive displays based on user selections, the processor being further operative to direct order information to each vendor selected for an order for fulfillment of the order, wherein the user interface comprises a touch screen display, a user initiates an order by dragging an order icon representing an order to a desired area on the touch screen display, and the user selects one or more vendors from which selections are to be made by moving a vendor icon representing each of the vendors to the order icon, wherein the touch screen display responds to multiple simultaneous touches.

2. The terminal of claim 1, wherein dragging a vendor icon onto the order icon opens a selection menu for the vendor represented by the vendor icon.

3. The terminal of claim 1, wherein the selection menu for a vendor includes mechanisms allowing navigation within, and expansion and reduction of the selection menu.

4. The terminal of claim 1, wherein dragging multiple vendor icons onto a single order icon opens a selection menu for each vendor from which selections are made simultaneously, and wherein selections from the different selection menus result in updates to the transaction record for the order.

5. The terminal of claim 1, wherein dragging multiple order icons to different open areas causes simultaneous initiation of multiple independent orders and wherein moving a vendor icon onto one of the order icons opens a selection menu for the vendor represented by the vendor icon, with the selection menu being effective for the order with which it is associated.

6. The terminal of claim 1, wherein the selection menu for a vendor includes mechanisms allowing navigation within, and expansion and reduction of the selection menu and wherein the mechanisms allowing navigation within, and expansion and reduction of the selection menu include operations involving multiple simultaneous touches.

7. The terminal of claim 1, wherein the display presents the transaction record upon opening an order and wherein the transaction record presented by the display is updated as selections are made.

8. The terminal of claim 7, wherein a user selection to conclude an order directs the processor to present a payment interface providing mechanisms and instructions for tender of payment for the order.

9. The terminal of claim 8, wherein tender of payment directs the processor to associate an order identifier with the order and to direct order details associated with the order identifier to each vendor furnishing elements of the order, and to provide the user with directions for receiving the order.

10. The terminal of claim 1, wherein the terminal stores vendor information reflecting vendor menus and prices for each vendor, and wherein selection menus are constructed based on the stored vendor information.

11. The terminal of claim 1, wherein the terminal periodically receives updated vendor information.

* * * * *